US010351710B2

(12) United States Patent
Gerard et al.

(10) Patent No.: US 10,351,710 B2
(45) Date of Patent: Jul. 16, 2019

(54) METHOD FOR THE PRODUCTION OF GRANULES COMPRISING SURFACE-REACTED CALCIUM CARBONATE

(71) Applicant: Omya International AG, Oftringen (CH)

(72) Inventors: Daniel E. Gerard, Basel (CH); Joachim Schoelkopf, Oberkulm (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 15/308,894

(22) PCT Filed: May 28, 2015

(86) PCT No.: PCT/EP2015/061869
§ 371 (c)(1),
(2) Date: Nov. 4, 2016

(87) PCT Pub. No.: WO2015/181306
PCT Pub. Date: Dec. 3, 2015

(65) Prior Publication Data
US 2017/0081519 A1    Mar. 23, 2017

Related U.S. Application Data

(60) Provisional application No. 62/008,672, filed on Jun. 6, 2014.

(30) Foreign Application Priority Data

May 30, 2014  (EP) ..................................... 14170578
Jun. 20, 2014  (EP) ..................................... 14173325

(51) Int. Cl.
*C09C 1/02*    (2006.01)
*C09C 3/04*    (2006.01)
*C09C 3/10*    (2006.01)
*C08K 3/26*    (2006.01)

(52) U.S. Cl.
CPC ............... *C09C 1/021* (2013.01); *C08K 3/26* (2013.01); *C09C 3/045* (2013.01); *C09C 3/10* (2013.01); *C01P 2002/60* (2013.01); *C01P 2004/02* (2013.01); *C01P 2004/03* (2013.01); *C01P 2004/60* (2013.01); *C01P 2004/61* (2013.01); *C01P 2004/62* (2013.01); *C01P 2006/12* (2013.01); *C01P 2006/14* (2013.01); *C01P 2006/16* (2013.01); *C01P 2006/90* (2013.01); *C08K 2003/265* (2013.01)

(58) Field of Classification Search
CPC ........... C09C 1/021; C09C 3/045; C09C 3/10; C08K 3/26
See application file for complete search history.

(56) References Cited

U.S. PATENT DOCUMENTS

| 6,323,269 | B1 | 11/2001 | Skelhorn et al. |
|---|---|---|---|
| 6,666,953 | B1 | 12/2003 | Gane et al. |
| 2004/0020410 | A1 | 2/2004 | Gane et al. |
| 2004/0255820 | A1 | 12/2004 | Chen et al. |
| 2006/0162884 | A1 | 7/2006 | Gane et al. |
| 2012/0020410 | A1 | 7/2012 | Gane et al. |
| 2012/0186492 | A1* | 7/2012 | Gane .................... D21H 17/14 106/465 |
| 2013/0192784 | A1 | 8/2013 | Buri et al. |

FOREIGN PATENT DOCUMENTS

| EP | 1974806 A1 | 10/2008 |
|---|---|---|
| EP | 1974807 A1 | 10/2008 |
| EP | 1975310 A1 | 10/2008 |
| EP | 1982759 A1 | 10/2008 |
| EP | 2264108 A1 | 12/2010 |
| EP | 2264109 A1 | 12/2010 |
| EP | 2589430 A1 | 5/2013 |
| EP | 2662416 A1 | 11/2013 |
| EP | 2679638 A1 | 1/2014 |
| EP | 2719373 A1 | 4/2014 |
| EP | 2719376 A1 | 4/2014 |
| JP | S61286290 A | 12/1986 |
| WO | 0039222 A1 | 7/2000 |
| WO | 2004083316 A1 | 9/2004 |
| WO | 2005121257 A2 | 12/2005 |

(Continued)

OTHER PUBLICATIONS

The International Search Report dated Aug. 15, 2015 for PCT/EP2015/061869.
The Written Opinion of International Searching Authority dated Aug. 15, 2015 for PCT/EP2015/061869.
Office Action dated Jan. 24, 2017 for Australian Patent Appln. No. 2015265924.
Acceptance Summary dated Mar. 7, 2017 for Australian Patent Appln. No. 2015265924.
Office Action dated Dec. 11, 2017 for Canadian Patent Appln. No. 2,948,606.

(Continued)

*Primary Examiner* — Pegah Parvini
(74) *Attorney, Agent, or Firm* — Amster, Rothstein & Ebenstein LLP

(57) ABSTRACT

The present invention relates to a method for the production of granules comprising surface-reacted calcium carbonate by a) providing surface-reacted calcium carbonate, b) saturating the surface-reacted calcium carbonate with one or more liquids; c) providing one or more binder; d) combining the liquid saturated surface-reacted calcium carbonate with the one or more binder under agitation in an agitation device; e) removing the liquid from the mixture of step d); as well as to the granules comprising surface-reacted calcium carbonate obtained by this method.

30 Claims, 10 Drawing Sheets

(56) References Cited

FOREIGN PATENT DOCUMENTS

| WO | 2009056942 A1 | 5/2009 |
| WO | 2009074492 A1 | 6/2009 |
| WO | 2010037753 A1 | 4/2010 |
| WO | 2010146530 A1 | 12/2010 |
| WO | 2010146531 A1 | 12/2010 |

OTHER PUBLICATIONS

Office Action dated Jul. 20, 2017 for Chinese Patent Appln. No. 201580028497.0.
Office Action dated Mar. 26, 2018 for Colombian Patent Appln. No. NC2016/0004439.
Search Report dated Dec. 5, 2014 for European Patent Appln. No. 14170578.0.
Search Report dated Dec. 15, 2014 for European Patent Appln. No. 14173325.3.
Office Action dated Oct. 24, 2017 for Japanese Patent Appln. No. 2017-514962.
Office Action dated Feb. 1, 2018 for Korean Patent Appln. No. 10-2016-7037029.
Office Action dated Jun. 15, 2017 for Singapore Patent Appln. No. 11201609445U.
Office Action dated Feb. 17, 2016 for Taiwanese Patent Appln. No. 104117096.
International Preliminary Report on Patentability dated Dec. 15, 2016 for International Patent Appln. No. PCT/EP2015/061869.
Office Action dated Apr. 5, 2018 for Russian Application No. 2016149385.
Search Report dated Apr. 3, 2018 for Russian Application No. 2016149385.
Office Action dated May 9, 2018 for Chilean Application No. 201603054.

\* cited by examiner

METHOD FOR THE PRODUCTION OF GRANULES COMPRISING SURFACE-REACTED CALCIUM CARBONATE

CROSS-REFERENCE TO RELATED APPLICATIONS

This is a U.S. national phase of PCT Application No. PCT/EP2015/061869, filed May 28, 2015, which claims priority to European Application No. 14170578.0, filed May 30, 2014, U.S. Provisional Application No. 62/008,672, filed Jun. 6, 2014 and European Application No. 14173325.3, filed Jun. 20, 2014.

The present invention relates to a method for the production of granules comprising surface-reacted calcium carbonate, as well as to the granules obtained thereby.

In the year of 1998, a new type of surface-reacted calcium carbonate was first described in FR 2787802 B1, subsequently in WO 00/39222 A1 and US 2004/0020410 A1, and is based on the reaction of natural ground calcium carbonate with gaseous $CO_2$ and with one or more medium-strong to strong $H_3O^+$ ion providers. The obtained product is a porous calcium carbonate having a special surface structure, porosity, and specific surface area providing a reduction in the weight of paper for a constant surface area without loss of physical properties, when it is used as a pigment or coating filler for the said paper.

In WO 2004/083316 A1, a further advantageous modification in the preparation of this surface-reacted calcium carbonate is described, wherein aluminium silicate, synthetic silica, calcium silicate, silicates and/or monovalent salt are involved, and which are also useful in paper-making applications.

Also, WO 2005/121257 A2 refers to the addition of advantageous additives in the production of said surface-reacted calcium carbonate, wherein one or more compounds of formula R—X are added, which, e.g. are selected from fatty acids, fatty amines or fatty alcohols.

WO 2009/074492 A1 especially relates to the optimization of the known process as regards precipitated calcium carbonate, as it turned out that due to the special conditions in the precipitation of calcium carbonate, the process useful for natural ground calcium carbonate did not provide the same good results for the surface-reaction of synthetic precipitated calcium carbonate.

Several further optimizations and modifications of the process for the preparation of surface-reacted calcium carbonate followed such as those described in EP 2 264 108 A1 (WO 2010/146530 A1) and EP 2 264 109 A1 (WO 2010/146531 A1) involving the use of weak acids in the preparation of surface-reacted calcium carbonate.

However, none of these documents explicitly mentions granulation of surface-reacted calcium carbonate.

Granules, however, in many applications are of considerable importance and more preferred than powders. Thus, agglomeration of powders leading to granules typically having a size range between 0.2 to 4.0 mm depending on their subsequent use is widely used to improve physical properties of powders like: wettability, flowability, bulk density and product appearance.

Furthermore, granulation is carried out, e.g. to prevent the segregation of the constituents of powder mixes, to prevent dusting or to improve flowability.

Granulation, i.e. the process in which the primary powder particles are made to adhere to form larger, multiparticle entities is a process of collecting particles together by creating bonds between them e.g. by a binding agent.

One of the most important types of granulation is wet granulation, wherein granules are formed by the addition of a granulation liquid onto a powder bed which is under the influence of an impeller. The agitation resulting in the system along with the wetting of the components within the formulation results in the agglomeration of the primary powder particles to produce wet granules. The granulation liquid contains a solvent which must be volatile so that it can be removed by drying, and be non-toxic. Water mixed into the powders can form bonds between powder particles that are strong enough to lock them together. However, once the water dries, the powders may fall apart. Therefore, water may not be strong enough to create and hold a bond. In such instances, the granulation liquid includes a binder.

Regarding surface-reacted calcium carbonate, also granules are generally known. For example, in EP 2 264 108 A1 (WO 2010/146530 A1), it is mentioned that the surface-reacted calcium carbonate obtained from the process described therein may be in the form of a cake, granules or a powder, and also in several documents describing different uses of surface-reacted calcium carbonate, such as in water purification, as a controlled release carrier, in fast disintegrating dosage forms, or gastroretentive drug formulation and delivery systems (EP 1 975 310 B1, EP 1 982 759 B1, EP 1 974 807 B1, EP 1 974 806 B1, EP 2 589 430 A1, WO 2010/037753 A1, EP 2 719 373 A1, or EP 2 719 376 A1), granules are generally mentioned.

These granules, however, which are either obtained as a result of the basic process of producing surface-reacted calcium carbonate, or by wet granulation, suffer from several disadvantages, such as e.g. a low stability and high fragility, or need a high amount of binder in order to increase stability of the granules.

Thus, surface-reacted calcium carbonate can be granulated using various methods, but, due to its porosity, conventional processes do not provide the desired result. Granulation has proven to be very difficult to process a stable product, requiring a large amount of binder and still failing to show much strength.

After many trials, it has been theorized that a significant part of the binder contained in the granulation liquid was lost in the porous structure of the surface-reacted calcium carbonate particles, and it was found by surprise that, if the pores of the particles are first saturated with the granulation liquid, whereas the binder is added afterwards, not only the stability of the resulting granules may be increased, but also the amount of binder may be decreased.

Thus, it is the object of the present invention to provide a process for the production of granules comprising surface-reacted calcium carbonate having a reduced binder demand, wherein the granules have an improved stability.

This object was solved by a method for the production of granules comprising surface-reacted calcium carbonate, characterized by the steps of a) providing surface-reacted calcium carbonate, wherein the surface-reacted calcium carbonate is a reaction product of natural ground or precipitated calcium carbonate with carbon dioxide and one or more acids, wherein the carbon dioxide is formed in situ by the acid treatment and/or is supplied from an external source;

b) saturating the surface-reacted calcium carbonate with one or more liquids;

c) providing one or more binder;

d) combining the liquid saturated surface-reacted calcium carbonate with the one or more binder under agitation in an agitation device;

e) removing the liquid from the mixture of step d).

The calcium carbonate subjected to surface treatment may be natural ground calcium carbonate (GCC) or synthetic, i.e. precipitated calcium carbonate (PCC).

The natural ground calcium carbonate preferably is selected from calcium carbonate containing minerals selected from the group comprising marble, chalk, dolomite, limestone and mixtures thereof. Precipitated calcium carbonate is preferably selected from the group comprising precipitated calcium carbonates having aragonitic, vateritic or calcitic mineralogical crystal forms or mixtures thereof.

In a preferred embodiment, the natural or precipitated calcium carbonate is ground prior to the treatment with one or more acids and carbon dioxide. The grinding step can be carried out with any conventional grinding device such as a grinding mill known to the skilled person.

In a preferred process for the preparation the natural and synthetic calcium carbonate, either finely divided, such as by grinding, or not, is suspended in water. Preferably, the slurry has a content of natural or synthetic calcium carbonate within the range of 1 wt % to 80 wt %, more preferably 3 wt % to 60 wt %, and even more preferably 5 wt % to 40 wt %, based on the weight of the slurry.

In a next step, an acid, which, in the context of the present invention is a Brønsted acid, i.e. a $H_3O^+$ ion donor, is added to the aqueous suspension containing the natural or synthetic calcium carbonate. Preferably, the acid has a $pK_a$ at 25° C. of 2.5 or less. If the $pK_a$ at 25° C. is 0 or less, the acid is preferably selected from sulphuric acid, hydrochloric acid, or mixtures thereof. If the $pK_a$ at 25° C. is from 0 to 2.5, the acid is preferably selected from $H_2SO_3$, $M^+HSO_4^-$ ($M^+$ is an alkali metal ion selected from the group comprising sodium and potassium), $H_3PO_4$, oxalic acid or mixtures thereof.

The one or more acids can be added to the suspension as a concentrated solution or a more diluted solution. Preferably, the molar ratio of the acid to the natural or synthetic calcium carbonate is from 0.05 to 4, more preferably from 0.1 to 2.

As an alternative, it is also possible to add the acid to the water before the natural or synthetic calcium carbonate is suspended.

In a next step, the natural or synthetic calcium carbonate is treated with carbon dioxide. If a strong acid such as sulphuric acid or hydrochloric acid is used for the acid treatment of the natural or synthetic calcium carbonate, the carbon dioxide is automatically formed. Alternatively or additionally, the carbon dioxide can be supplied from an external source.

Acid treatment and treatment with carbon dioxide can be carried out simultaneously which is the case when a strong acid is used. It is also possible to carry out acid treatment first, e.g. with a medium strong acid having a $pK_a$ in the range of 0 to 2.5, followed by treatment with carbon dioxide supplied from an external source.

Preferably, the concentration of gaseous carbon dioxide in the suspension is, in terms of volume, such that the ratio (volume of suspension):(volume of gaseous $CO_2$) is from 1:0.05 to 1:20, even more preferably 1:0.05 to 1:5.

In a preferred embodiment, the acid treatment step and/or the carbon dioxide treatment step are repeated at least once, more preferably several times.

Subsequent to the acid treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural or synthetic calcium carbonate as an aqueous suspension having a pH of greater than 6.0, preferably greater than 6.5, more preferably greater than 7.0, even more preferably greater than 7.5. If the aqueous suspension is allowed to reach equilibrium, the pH is greater than 7. A pH of greater than 6.0 can be adjusted without the addition of a base when stirring of the aqueous suspension is continued for a sufficient time period, preferably 1 hour to 10 hours, more preferably 1 to 5 hours.

Alternatively, prior to reaching equilibrium, which occurs at a pH greater than 7, the pH of the aqueous suspension may be increased to a value greater than 6 by adding a base subsequent to carbon dioxide treatment. Any conventional base such as sodium hydroxide or potassium hydroxide can be used.

Further details about the preparation of the surface-reacted natural calcium carbonate are disclosed in WO 00/39222 A1, WO 2004/083316 A1, WO 2005/121257 A2, WO 2009/074492 A1, EP 2 264 108 A1, EP 2 264 109 A1 and US 2004/0020410 A1, the content of these references herewith being included in the present application.

Surface-reacted calcium carbonate being useful in the present invention may also be prepared by contacting ground natural calcium carbonate with at least one water-soluble acid and with gaseous $CO_2$, wherein said acid(s) have a $pK_a$ of greater than 2.5 and less than or equal to 7, when measured at 20° C., associated with the ionisation of their first available hydrogen, and a corresponding anion formed on loss of this first available hydrogen capable of forming water-soluble calcium salts. Subsequently, at least one water-soluble salt, which in the case of a hydrogen-containing salt has a $pK_a$ of greater than 7, when measured at 20° C., associated with the ionisation of the first available hydrogen, and the salt anion of which is capable of forming water-insoluble calcium salts, is additionally provided.

In this respect, exemplary acids are acetic acid, formic acid, propanoic acid and mixtures thereof, exemplary cations of said water-soluble salt are selected from the group consisting of potassium, sodium, lithium and mixtures thereof, and exemplary anions of said water-soluble salt are selected from the group consisting of phosphate, dihydrogen phosphate, monohydrogen phosphate, oxalate, silicate, mixtures thereof and hydrates thereof.

Further details about the preparation of these surface-reacted natural calcium carbonates are disclosed in EP 2 264 108 A1 and EP 2 264 109 A1, the content of which herewith being included in the present application.

Similarly, surface-reacted precipitated calcium carbonate is obtained. As can be taken in detail from WO 2009/074492 A1, surface-reacted precipitated calcium carbonate is obtained by contacting precipitated calcium carbonate with $H_3O^+$ ions and with anions being solubilized in an aqueous medium and being capable of forming water-insoluble calcium salts, in an aqueous medium to form a slurry of surface-reacted precipitated calcium carbonate, wherein said surface-reacted precipitated calcium carbonate comprises an insoluble, at least partially crystalline calcium salt of said anion formed on the surface of at least part of the precipitated calcium carbonate.

Said solubilized calcium ions correspond to an excess of solubilized calcium ions relative to the solubilized calcium ions naturally generated on dissolution of precipitated calcium carbonate by $H_3O^+$ ions, where said $H_3O^+$ ions are provided solely in the form of a counterion to the anion, i.e. via the addition of the anion in the form of an acid or non-calcium acid salt, and in absence of any further calcium ion or calcium ion generating source.

Said excess solubilized calcium ions are preferably provided by the addition of a soluble neutral or acid calcium salt, or by the addition of an acid or a neutral or acid non-calcium salt which generates a soluble neutral or acid calcium salt in situ.

Said $H_3O^+$ ions may be provided by the addition of an acid or an acid salt of said anion, or the addition of an acid or an acid salt which simultaneously serves to provide all or part of said excess solubilized calcium ions.

In a preferred embodiment of the preparation of the surface-reacted natural or synthetic calcium carbonate, the natural or synthetic calcium carbonate is reacted with the acid and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural or synthetic calcium carbonate before adding the acid and/or carbon dioxide.

Alternatively, the silicate and/or silica and/or aluminium hydroxide and/or earth alkali aluminate and/or magnesium oxide component(s) can be added to the aqueous suspension of natural or synthetic calcium carbonate while the reaction of natural or synthetic calcium carbonate with an acid and carbon dioxide has already started. Further details about the preparation of the surface-reacted natural or synthetic calcium carbonate in the presence of at least one silicate and/or silica and/or aluminium hydroxide and/or earth alkali aluminate component(s) are disclosed in WO 2004/083316 A1, the content of this reference herewith being included in the present application.

The surface-reacted natural or synthetic calcium carbonate can be kept in suspension, optionally further stabilised by a dispersant. Conventional dispersants known to the skilled person can be used. A preferred dispersant is polyacrylic acid.

Alternatively, the aqueous suspension described above can be dried.

The surface-reacted natural or precipitated calcium carbonate to be used in the present invention preferably is provided in the dried powder form.

Furthermore, in a preferred embodiment, the surface-reacted natural or synthetic calcium carbonate has a specific surface area of from 1 $m^2$/g to 200 $m^2$/g, preferably 2 $m^2$/g to 150 $m^2$/g, more preferably 20 $m^2$/g to 80 $m^2$/g, most preferably 40 $m^2$/g to 50 $m^2$/g, measured using nitrogen and the BET method according to ISO 9277.

It is preferred that the surface-reacted calcium carbonate has a volume median grain diameter $d_{50}$ of from 0.5 to 50 µm, preferably from 0.7 to 25 µm, more preferably 0.8 to 20 µm, particularly 1 to 10 µm measured with a Malvern Mastersizer 2000 Laser Diffraction System. The method and the instrument are known to the skilled person and are commonly used to determine grain sizes of fillers and pigments.

Preferably, the surface-reacted natural or synthetic calcium carbonate has an intra-particle porosity within the range of from 5 vol. % (v/v) to 50 vol. % (v/v), preferably of from 20 vol. % (v/v) to 50 vol. % (v/v), especially of from 30 vol. % (v/v) to 50 vol. % (v/v) calculated from a mercury porosimetry measurement as described in the experimental section.

It is preferred that the surface-reacted calcium carbonate has a intra-particle intruded specific pore volume within the range of 0.150 to 1.300 $cm^3$/g, and preferably of 0.178 to 1.244 $cm^3$/g, calculated from mercury porosimetry measurement as described in the experimental section. The total pore volume seen in the cumulative intrusion data can be separated into two regions with the intrusion data from 214 µm down to about 1-4 µm showing the coarse packing of the sample between any agglomerate structures contributing strongly. Below these diameters lies the fine interparticle packing of the particles themselves. If they also have intra-particle pores, then this region appears bi modal. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired specific pore volume of the internal pores alone as the specific pore volume per unit mass. The same principle of subtraction, of course, applies for isolating any of the other pore size regions of interest.

Thus, the intra-particle porosity determined as the pore volume per unit particle volume is within the range of from 20 vol. % (v/v) to 99 vol. % (v/v), preferably from 30 vol. % (v/v) to 70 vol. % (v/v), more preferably from 40 vol. % (v/v) to 60 vol. % (v/v), e.g. 50 vol. % (v/v), calculated from a mercury porosimetry measurement.

The pore size of the surface-reacted calcium carbonate preferably is in a range of from 10 to 100 nm, more preferably in a range of between 20 and 80 nm, especially from 30 to 70 nm, e.g. 50 nm determined by mercury porosimetry measurement.

As mentioned above, before granulating the surface-reacted calcium carbonate particles, they are saturated with the granulation liquid.

This liquid may generally be any one commonly used in the field of granulation, and is preferably selected from the group comprising water, methanol, ethanol, n-butanol, iso-propanol, n-propanol, and mixtures thereof. The most preferred liquid according to the present invention is water.

The selection of the liquid will also depend on the nature of the binder in order to ensure an even distribution of same in the granulation process.

The liquid may contain minor amounts of compounds like minerals and salts such as those naturally occurring in water. It may furthermore contain trace amounts of polymers commonly found in the water systems of production plants, such as for example surfactants, dispersing agents, flotation agents, etc.

However, according to the invention, the liquid acts as a granulation liquid, i.e. a solvent or medium for wet granulation. It is not to be understood as an active ingredient, i.e. a substance having a specific effect in an organism and causing a specific reaction, such as pharmaceutical drugs for humans, animals or plants, pesticides, herbicides, fungicides, biocides, repellents, food, cosmetics, flavors, sweeteners, fragrances, flame retardants, etc.

Liquid saturation may be achieved by adding the liquid to dry or not completely saturated surface-reacted calcium carbonate, or, if the surface-reacted calcium carbonate is provided as a suspension or filter cake, it may also be achieved by removing excess liquid. This may be done thermally or mechanically by techniques known to the person skilled in the art. By way of example the following equipment or apparatuses can be used to remove excess liquid: jet driers, flash driers, spray driers, or fluidized bed.

According to the present invention, the particles are defined to be liquid saturated, if the whole intraparticle pore volume of same is filled by the liquid. Exceeding saturation may be seen visually by the onset of particles adhering one to another thus appearing to grow larger in size. Saturation of the material can be determined visually and tactually. In order to determine the optimal point, starting with the dry powder, water might be added slowly by means of a spray bottle or some other means of evenly distributing the water into the powder. At the same time that the water is being added, or between each spray of water, it is important to mix the powder. Continual mixing of the powder will ensure that the water is properly distributed throughout. While this is occurring below saturation, the material will continue acting still like a powder, which means it flows unevenly, lightly and continues to dust when shaken. Occasional small clumps might still form, where the water level was added unevenly, but, prior to saturation, these are easily broken up again when worked back into the rest of the powder. Nearing, but not reaching saturation can be seen when the powder starts to feel cold to the hand, but still leaves the hand dry. If at this point, the material still looks powdery and does not appear to agglomerate, more water may be added. Saturation, or approximate saturation may be defined when the product no longer flows freely as a powder, instead appearing to agglomerate slightly and to stick together when pressed between the fingers. Whereas, early in the process, when small agglomerates may be broken up easily by working them back into the rest of the powder and thus distributing the water throughout the material, upon reaching saturation, these agglomerates cannot be easily broken up, since water is ubiquitous in the product and can therefore not be further distributed.

It is important that the material not be oversaturated wherein the material appears to form granules already or feels, looks or sticks like a mud. Thus, by these initial trials the necessary level of water can be determined, and subsequently, e.g. at a larger scale, other means of bringing the material to this solids level may be used, including automated mixing/water addition or even drying a cake/slurry to the desired level.

Binders which may be used in step c) of the present invention generally are those well-known in the art of granulation. In a preferred embodiment the one or more binder is selected from the group comprising synthetic polymers such as methylcellulose, ethylcellulose, sodium carboxymethylcellulose, hydroxypropyl methylcellulose (HPMC), hydroxypropylcellulose (HPC), ethylhydroxyethylcellulose (EHEC), polyvinyl pyrrolidone (PVP), polyethylene glycol (PEG), polyvinyl alcohols, polymethacrylates; and natural binders such as plant gums, e.g., acacia, tragacanth, sandarac, ghatti, karaya, locust bean and guar; proteins such as gelatin, casein, collagen; saccharides and polysaccharides such as starch and its derivatives, inulin, cellulose, pectins, carrageenans and sugars; animal exudates such as shellac; alginic acid, and mixtures thereof.

In this respect, it is to note that, if required, the binder may also have disintegrating properties under certain conditions. Such binders, which are known in the art, e.g. physically modified starch, have binding properties under granulation conditions, but are able to disintegrate the granules by, e.g. moisture sorption and swelling, if required.

Typically, the one or more binder is added to the liquid saturated surface-reacted calcium carbonate in an amount of from 0.5 to 50 wt %, preferably of from 1 to 25 wt %, more preferably of from 1.5 to 20 wt %, even more preferably of from 2.5 to 15 wt %, most preferably of from 5 to 10 wt %, e.g. 9 wt % based on the weight of surface-reacted calcium carbonate of step a).

The binder may be added in dry form, or in the form of emulsions, dispersions, or solutions. In case where the binder is added in dry form or in a very high concentrated form, it may be possible that additional liquid is necessary during step d) before step e).

It is a preferred aspect of the present invention that less binder is needed according to the inventive process than if the surface-reacted calcium carbonate would not be liquid saturated before the addition of the one or more binder.

As regards the order of addition, it is preferred that the one or more binder is added to the agitation device simultaneously with or after the liquid saturated surface-reacted calcium carbonate of step b).

It may, however, be necessary to adjust the amount of binder, surface-reacted calcium carbonate and/or liquid saturated calcium carbonate, after the combination of the liquid saturated surface-reacted calcium carbonate of step b) and the one or more binder of step c) in step d).

Thus, it may be preferred that further surface-reacted calcium carbonate or liquid saturated surface-reacted calcium carbonate or mixtures thereof, are added, if the mixture of step d) appears to be too liquid or paste-like.

Additional surface-reacted calcium carbonate or liquid saturated surface-reacted calcium carbonate or mixtures thereof may be added in an amount of from 1 to 30 wt %, preferably of from 5 to 20 wt %, more preferably of from 8 to 15 wt %, e.g. 10 wt % based on the weight of the surface-reacted calcium carbonate provided in step a).

On the other hand, if the mixture is too powder-like, it may be advantageous to add more liquid. When liquid addition is nearly sufficient, small agglomerates will form in a primary agglomerate phase, which might not have the desired size. Upon further addition of liquid, the granules will grow larger in size in what might be referred to as a secondary agglomeration phase, wherein the primary agglomerates then agglomerate to each other, and granules of a larger size may be obtained, if desired.

The addition of further liquid may not be required, if the binder is added in the form of emulsions, dispersions, or solutions.

The mixture has the appropriate consistency as soon as the desired granule sizes, or granule size distribution, respectively, have been achieved, whereupon agitation may be continued. The granulation equipment may be selected from the conventionally used ones for granulation purposes. Thus, the agitation device may be selected from the group comprising Eirich mixers, fluidized bed dryers/granulators/mixers, plate granulators, table granulators, drum granulators, disc granulators, dish granulators, plowshare mixers, high speed blenders and rapid mixer granulators.

It might be noted that there may be differences as regards the granule sizes or granule size distributions to be achieved depending on the method used or the speed of mixing.

For example, the use of a fluidized bed mixer for granulation appears to provide a more uniform granule size distribution than the Lödige mixer, whereas the Lödige mixer gives a wider size distribution. Thus, multiple size ranges may be provided.

After the granulation process is completed, the liquid is removed by means of separating the liquid from the resulting granules. This is preferably achieved by drying, e.g. by means selected from the group comprising drying in a rotational oven, jet-drying, fluidized bed drying, freeze drying and flash drying.

The resulting granules may have a wide size range, wherein different size fractions may be separated by conventional means such as sieving.

Generally, the granules may have a volume median particle size of from 0.1-6 mm, preferably 0.2-5 mm and more preferably from 0.3 to 4 mm. Depending on the intended use of the granules size fractions of from 0.3 to 0.6 mm or 1 mm to 4 mm may be obtained, as well as grain sizes of from 0.6 to 1 mm or 1 to 2 mm determined by sieve fractioning.

The granules comprising surface reacted calcium carbonate obtained after step e) may have a specific surface area of from 1 to 150 $m^2/g$, preferably of from 2 to 100 $m^2/g$, more preferably of from 20 to 70 $m^2/g$, most preferably of from 30 to 40 $m^2/g$, measured using nitrogen and the BET method according to ISO 9277.

The granules obtained by the process according to the present invention have turned out to be more stable than those provided without binder or according to wet granulation without a previous liquid saturation of the surface-reacted calcium carbonate.

Consequently, also the granules comprising surface reacted calcium carbonate obtained by the method according to the present invention are an aspect of the present invention.

The following figures, examples and tests will illustrate the present invention, but are not intended to limit the invention in any way.

EXAMPLES

1. Measurement Methods

Figure 1A:
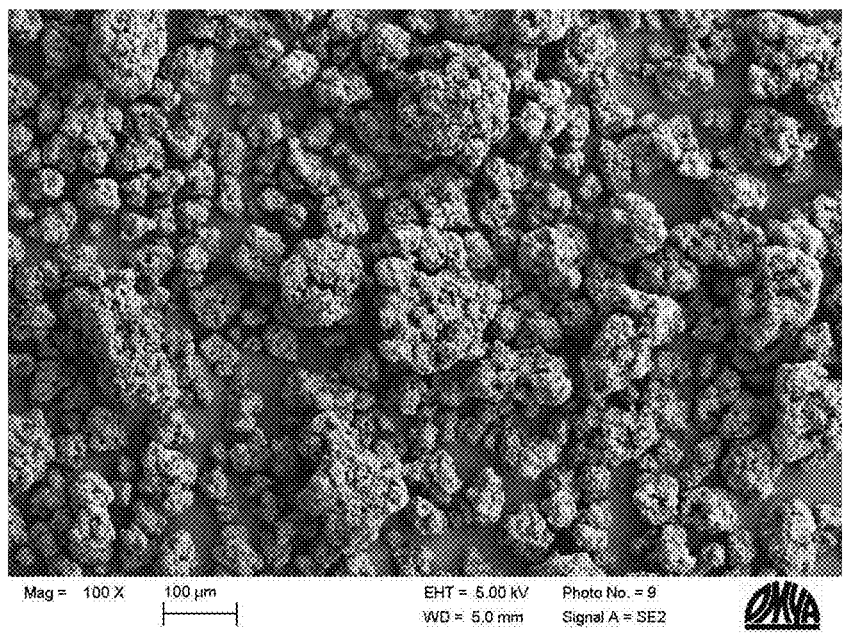
FIG. 1 shows SEM images of granules obtained according to comparative example 1 at 100 times (FIG. 1a) and 1000 times (FIG. 1b) magnification.

The following measurement methods were used to evaluate the parameters given in the examples and claims.

BET Specific Surface Area (SSA) of a Material

The BET specific surface area was measured via the BET process according to ISO 9277 using nitrogen, following conditioning of the sample by heating at 250° C. for a period of 30 minutes. Prior to such measurements, the sample was filtered, rinsed and dried at 110° C. in an oven for at least 12 hours.

Particle Size Distribution (Volume % Particles with a Diameter <X), $d_{50}$ Value (Volume Median Grain Diameter) and $d_{98}$ Value of a Particulate Material:

Volume median grain diameter $d_{50}$ was evaluated using a Malvern Mastersizer 2000 Laser Diffraction System (Malvern Instruments Plc., Great Britain) using the Fraunhofer light scattering approximation. The method and instrument are known to the skilled person are commonly used to determine particle sizes of fillers and other particulate materials.

The $d_{50}$ or $d_{98}$ value, measured using a Malvern Mastersizer 2000 Laser Diffraction System, indicates a diameter value such that 50% or 98% by volume, respectively, of the particles have a diameter of less than this value. The raw data obtained by the measurement is analyzed using the Mie theory, with a particle refractive index of 1.57 and an absorption index of 0.005.

The weight median grain diameter is determined by the sedimentation method, which is an analysis of sedimentation behaviour in a gravimetric field. The measurement is made with a Sedigraph™ 5100 of Micromeritics Instrument Corporation. The method and the instrument are known to the skilled person and are commonly used to determine grain size of fillers and pigments. The measurement is carried out in an aqueous solution of 0.1 wt % $Na_4P_2O_7$. The samples were dispersed using a high speed stirrer and supersonicated.

The processes and instruments are known to the skilled person and are commonly used to determine grain size of fillers and pigments.

Porosity/Pore Volume

The porosity or pore volume is measured using a Micromeritics Autopore IV 9500 mercury porosimeter having a maximum applied pressure of mercury 414 MPa (60 000 psi), equivalent to a Laplace throat diameter of 0.004 µm (~ nm). The equilibration time used at each pressure step is 20 seconds. The sample material is sealed in a 5 $cm^3$ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p 1753-1764.).

Scanning Electron Microscopy (SEM) Pictures

Samples for SEM investigation were prepared by filtering the suspensions and letting them dry in a drying oven at 110° C. The samples were sputtered with 20 nm gold before taking the pictures.

2. Material and Equipment 2.1. Equipment

Fluidized Bed Mixer (Strea-1 laboratory fluid bed mixer by Aeromatic-Fielder using a 2 l transparent cell)

Lödige (Model L5, 5 l Mixer)

2.2. Material

Surface-Reacted Calcium Carbonate

Surface-reacted calcium carbonate (SRCC) 1 ($d_{50}$=7.0 µm, $d_{98}$=16.1 µm, SSA=55.4 $m^2$ $g^{-1}$) The intra-particle intruded specific pore volume is 0.871 $cm^3/g$ (for the pore diameter range of 0.004 to 0.4 µm).

SRCC 1 was obtained by preparing 300 liters of an aqueous suspension of ground calcium carbonate in a mixing vessel by adjusting the solids content of a ground limestone calcium carbonate from Omya SAS, Orgon having a mass based median particle size of 1.3 µm, as determined by sedimentation, such that a solids content of 10 wt %, based on the total weight of the aqueous suspension, is obtained.

Whilst mixing the slurry at a speed of 12.7 m/s, 9.6 kg phosphoric acid was added in form of an aqueous solution containing 30 wt % phosphoric acid to said suspension over a period of 12 minutes at a temperature of 70° C. After the addition of the acid, the slurry was stirred for additional 5 minutes, before removing it from the vessel and drying.

Surface-reacted calcium carbonate (SRCC) 2 ($d_{50}$=6.6 µm, $d_{98}$=13.7 µm, SSA=59.9 $m^2\ g^{-1}$) The intra-particle intruded specific pore volume is 0.939 $cm^3$/g (for the pore diameter range of 0.004 to 0.51 µm).

SRCC 2 was obtained by preparing 350 liters of an aqueous suspension of ground calcium carbonate in a mixing vessel by adjusting the solids content of a ground limestone calcium carbonate from Omya SAS, Orgon having a mass based median particle size of 1.3 µm, as determined by sedimentation, such that a solids content of 10 wt %, based on the total weight of the aqueous suspension, is obtained.

Whilst mixing the slurry at a speed of 6.2 m/s, 11.2 kg phosphoric acid was added in form of an aqueous solution containing 30 wt % phosphoric acid to said suspension over a period of 20 minutes at a temperature of 70° C. After the addition of the acid, the slurry was stirred for additional 5 minutes, before removing it from the vessel and drying using a j et-dryer.

Binder
Sodium carboxymethylcellulose from Sigma Aldrich (average molar mass 90000 g/mol; CAS No. 9004-32-4)
Hydroxypropylmethylcellulose (HPMC): Pharmacoat 603 (Harke Group, Müllheim an der Ruhr, Germany)
Polyvinylpyrrolidone (PVP): Kollidon K30 (BASF)
Pectin Citrus, Powder, from Alfa Aesar (Poly-D-galacturonic acid methyl ester; J61021; CAS number 9000-69-5; EC number 232-553-0)
Locust beam gum from *Ceratorin siliqua* seeds from Sigma-Aldrich (Galactomannan polysaccharide; G0753; CAS number 9000-40-2; EC number 232-541-5)
3. Granulation Experiments
3.1. Fluid Bed Mixer Granulation Example 1 (Comparative)

200 g surface-reacted calcium carbonate SRCC 1 was added to the fluid bed mixer. Additionally, a 10% (w/w) solution of Kollidon K30 (polyvinylpyrrolidone, PVP) in water was prepared. While running the fluid-bed system under varying air flows ranging from 0.5-2 $m^3\ min^{-1}$, the PVP solution was added to the system at a rate of about 30 g/min. After the addition of a total of 500 g PVP solution, granules were attained. At this point the liquid spray was turned off, while the air was allowed to continue until a dry product was attaing. The sample was then taken by pouring it out of the top of the 2 l vessel.

The resulting granules were sieved on a Retsch sieve and had particle sizes of less than 600 µm, mostly between 0.2-0.4 mm.

Figure 1B:
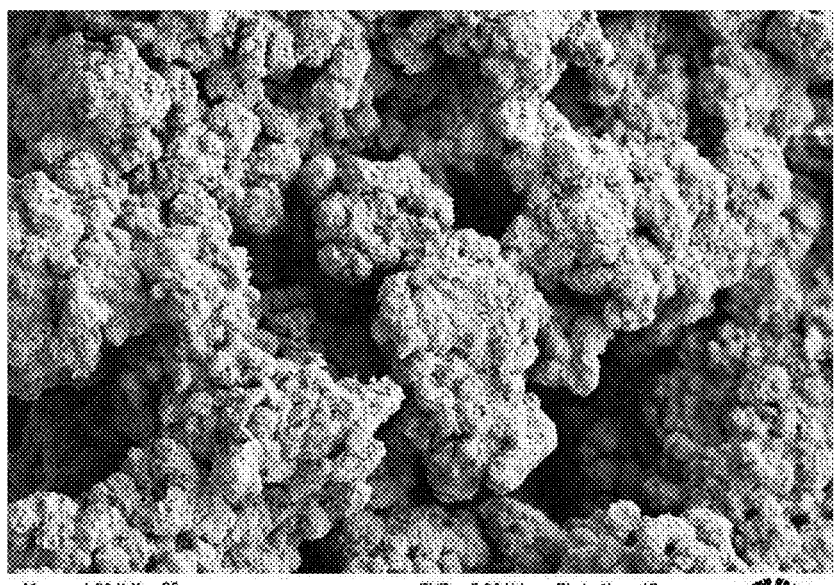
Figure 2:
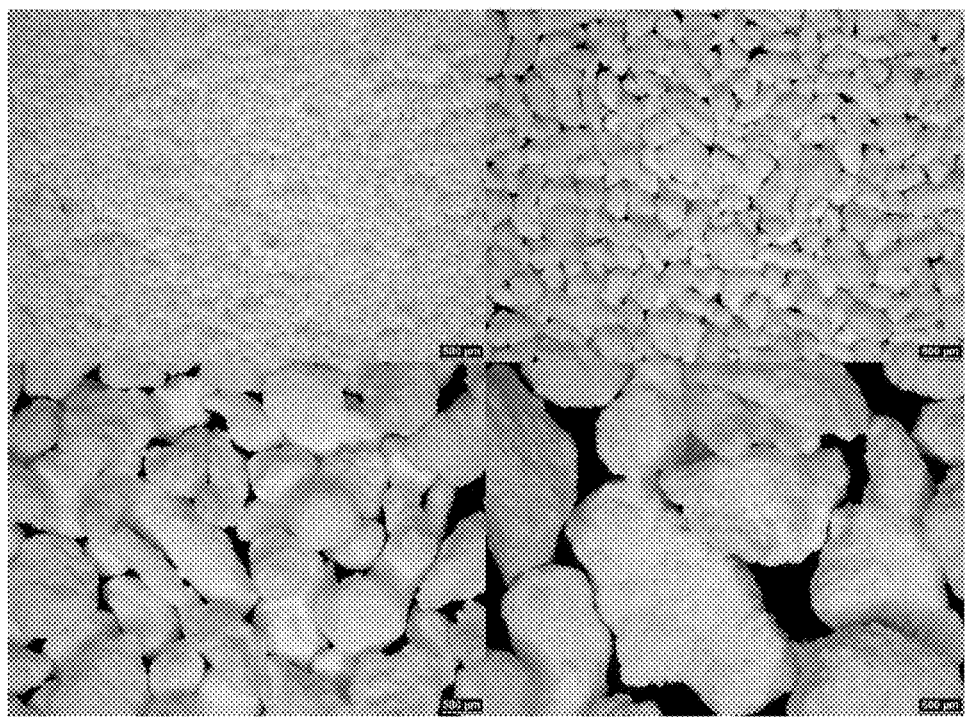
FIGS. 2-5 are light microscope pictures of different sieve fractions of examples 9 to 12, namely: top-left=0 to 0.3 mm, top-right=0.3 mm to 0.6 mm, bottom-left=0.6 mm to 1 mm and bottom-right=1 mm to 2 mm.
Figure 3:
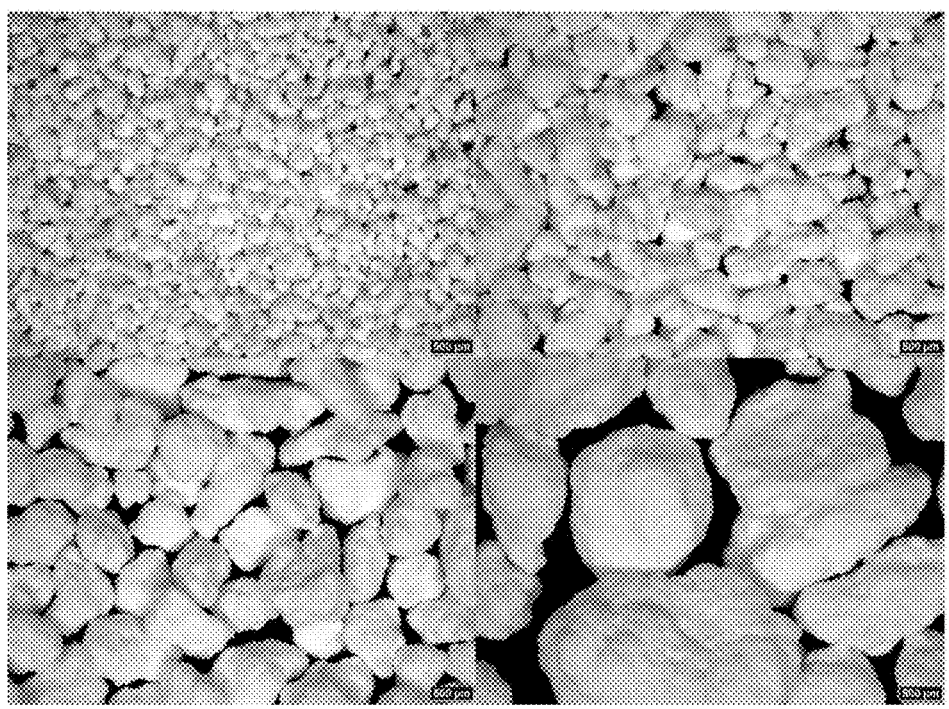
Figure 4:
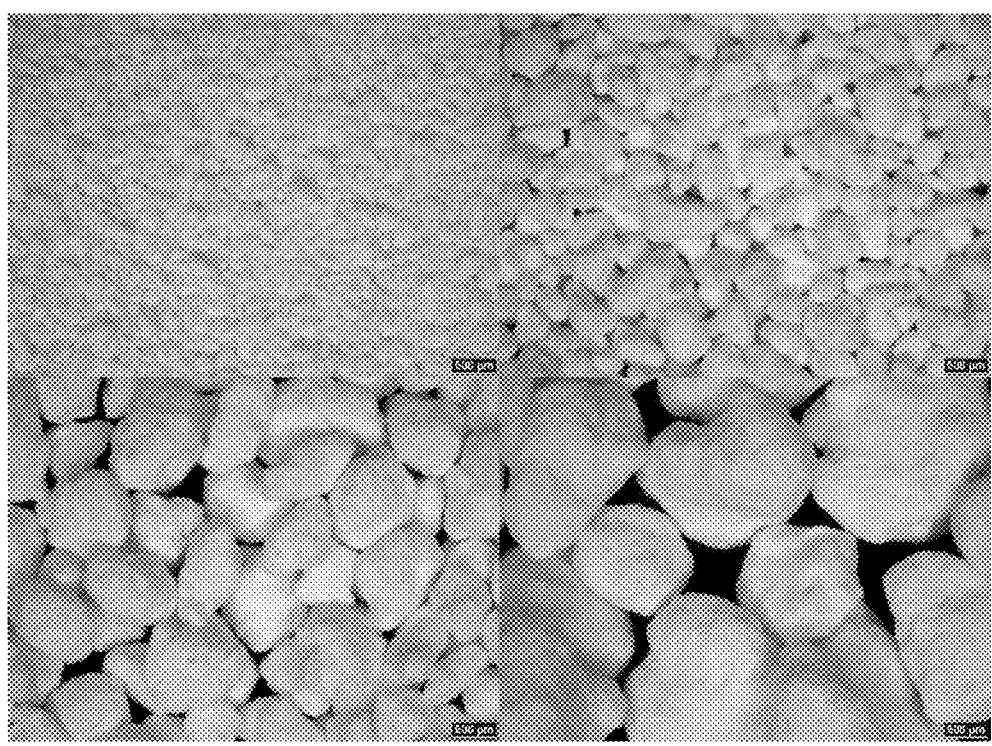
Figure 5:
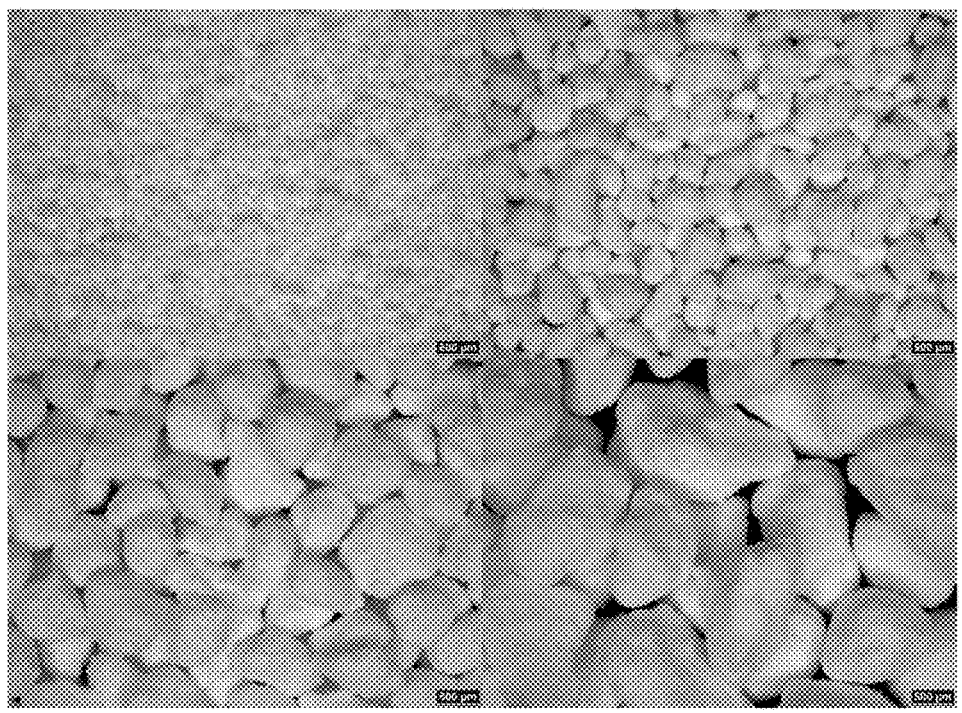

The resulting granules are illustrated in FIG. 1.

In Example 1, 25 wt % binder (50 g) had to be added in order to obtain granules of surface reacted calcium carbonate having particle sizes of less than 600 µm, wherein the resulting granules were undesirably fragile and dusting.

3.2. Lödige Mixer Granulation

Example 2 (Comparative)

A 7.5 wt % sodium carboxymethylcellulose solution was prepared using tap water. 600 g SRCC 2 was then saturated with 300 g of this binder containing solution, such that 22.5 g of sodium carboxymethylcellulose was added. This product was then added to the Lödige mixer and, using a spray bottle, 100 g of this solution was added over time, while mixing the powder with both the blending element (speed varied between 500 rpm and the maximum speed (999 rpm), mainly between 700-999 rpm) and the cutter. After this was finished and a total of 5 wt % sodium carboxymethylcellulose based on the weight of surface-reacted calcium carbonate was added to the SRCC 2, tap water was sprayed in until the material passed the clumpy pre-granule state and the sample turned to a paste. This was again rectified via the addition of 150 g dry surface-reacted calcium carbonate SRCC 2. The sample was mixed a few more minutes until individual granules were formed. The final solids of this sample was 60 wt %. Subsequently, the sample was removed and dried at 90° C. for 12 hours.

The dried sample was sieved on a Retsch sieve into separate size fractions, namely <0.3 mm, between 0.3 and 0.6 mm, between 0.6 and 1 mm, and between 1 and 2 mm.

Example 3 (Inventive)

530 g surface-reacted calcium carbonate SRCC 2 was saturated with water providing a solids content of 61 wt % and added to the Lödige mixer. Subsequently, 51 g sodium carboxymethylcellulose was added, dry, and the combination was mixed for several minutes to ensure proper blending. Subsequently, using a spray bottle, tap water was added over time, while mixing the powder with both the blending element (speed varied between 500 rpm and the maximum speed (999 rpm), mainly between 700-999 rpm) and the cutter until the material started to look a little clumpy. At this point, a little more water was then added and the sample turned to a paste. This was again rectified via the addition of 100 g dry surface-reacted calcium carbonate SRCC 2. The sample was mixed a few more minutes until individual granules were formed. The final solids of this sample was 61 wt %. Subsequently, the sample was removed and dried at 90° C. for 12 hours.

The dried sample was sieved on a Retsch sieve into separate size fractions, namely <0.3 mm, between 0.3 and 0.6 mm, between 0.6 and 1 mm, and between 1 and 2 mm. The results can be taken from table 3.

Examples 4-12 (Inventive)

Using the method established in Example 3, Examples 4 to 12 were run with varying amounts of surface-reacted calcium carbonate SRCC 2, sodium carboxymethylcellulose binder and water, as well as varying blending speeds.

The respective variables and values can be taken from table 2. The respective granule size distributions can be taken from table 3.

FIGS. 2-5 are light microscope pictures of the different sieve sizes of Examples 9 to 12, namely: top-left=0 to 0.3 mm, top-right=0.3 mm to 0.6 mm, bottom-left=0.6 mm to 1 mm and bottom-right=1 mm to 2 mm.

TABLE 2

| Example | SRCC [g] | Solids after water [wt %] | Binder [g] | Binder wt % on SRCC | Extra SRCC [g] | Blending speed [rpm] |
|---|---|---|---|---|---|---|
| 3 | 530 | 61% | 51 | 9.6% | 100 | 500-999 |
| 4 | 512 | 63% | 51 | 10.0% | 100 | 500-999 |
| 5 | 521 | 64% | 51 | 9.8% | 100 | 999 |
| 6 | 523 | 67% | 52 | 9.9% | 100 | 900-999 |
| 7 | 521 | 65% | 51 | 9.8% | 100 | 900-999 |
| 8 | 517 | 63% | 51 | 9.9% | 100 | 900-999 |
| 9 | 521 | 63% | 51 | 9.8% | 0 | 900-999 |
| 10 | 515 | 66% | 51 | 9.9% | 30 | 900-999 |
| 11 | 522 | 65% | 26 | 5.0% | 100 | 900-999 |
| 12 | 524 | 65% | 39 | 7.4% | 100 | 900-999 |

TABLE 3

| | wt % of Particle size x [mm] | | | |
|---|---|---|---|---|
| Example | x < 0.3 | 0.3 < x < 0.6 | 0.6 < x < 1 | 1 < x < 2 |
| 3 | 16 | 15 | 19 | 49 |
| 4 | 11 | 13 | 21 | 55 |
| 5 | 13 | 18 | 26 | 44 |
| 6 | 13 | 16 | 21 | 50 |
| 7 | 12 | 18 | 27 | 43 |
| 8 | 18 | 20 | 26 | 36 |
| 9 | 49 | 23 | 13 | 15 |
| 10 | 2 | 20 | 33 | 45 |
| 11 | 8 | 11 | 19 | 62 |
| 12 | 13 | 21 | 26 | 40 |

The above examples clearly show that granules can be produced from surface-rected calcium carbonate with standard binding agents. However, it can be seen that excessive binder does not have to necessarily lead to a better product. Due to the porosity of the material large amounts of binder gets lost, when the liquid is absorbed into the pores. This is the reason why, e.g. in Example 1, although 25 wt % PVP binder (considered one of the best binders) was used, the sample did not show any better qualities. In fact, it was rather fragile. The binder solution had a higher concentration, and it is believed that this solution filled the pores, thus wasting the binder.

Subsequent trials using the Lödige mixer showed that saturating the surface-reacted calcium carbonate with the solvent prior to binder and binding solvent, resultated in a decreased amount of binder needed for producing stable granules of different sizes (cf. especially Examples 11 and 12 using 5 and 7.4 wt % binder instead of 10 wt % at comparable results).

This applies for different equipments, wherein using a fluidized bed mixer for granulation appear to provide a more uniform granule size distribution than the Lödige mixer, whereas the Lödige mixer gives a wider size distribution. Thus, also multiple size ranges may be provided.

Furthermore, the products according to the invention are much more stable and provide significantly less dusting.

Figure 6A:
FIGS. 6a and 6b show granules produced according to the inventive production method and the conventional production method in dishes (FIG. 6a), as well as remaining dust after removing these samples from the dishes (FIG. 6b).
Figure 6B:
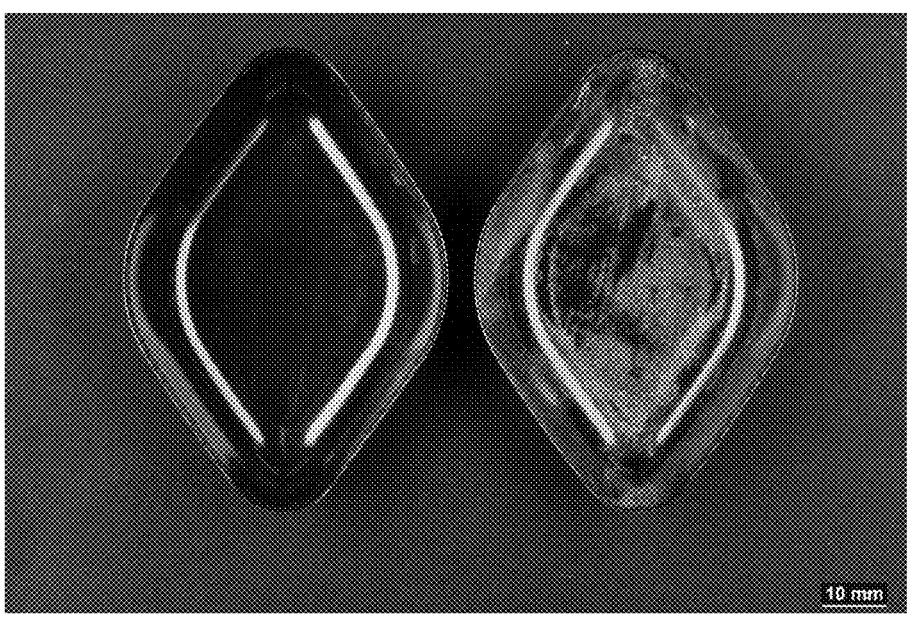

This is illustrated in FIGS. 6a and 6b. On the left hand side of FIG. 6a, granules of Example 11 (using 5 wt % sodium carboxymethylcellulose binder) are shown. On the right hand side a sample of Example 2 is shown, which was produced without previous liquid saturation. From FIG. 6b it can be taken that, after removing both of the samples, no visible dust is left from inventive Example 11, whereas a considerable amount of dust remains in the dish of Example 2 produced according to the conventional production method without initial liquid saturation of surface-reacted calcium carbonate.

This clearly shows the advantage of the method for producing granules comprising surface-reacted calcium carbonate according to the invention.

Examples 13-21 (Inventive)

Using the method established in Example 3, Examples 13 to 21 were run with surface-reacted calcium carbonate SRCC 1, varying amounts of Locust beam gum (Example 13 to 17) and Pectin Citrus (Example 18 to 21) binders and water.

The respective variables and values can be taken from table 4. The respective granule size distributions can be taken from table 5.

TABLE 4

| Example | SRCC [g] | Solids after water [wt %] | Binder [g] | Binder wt % on SRCC | Extra SRCC [g] | Blending speed [rpm] |
|---|---|---|---|---|---|---|
| 13 | 550 | 65% | 55 | 10% | 100 | 500-999 |
| 14 | 550 | 64% | 27.5 | 5% | 100 | 500-999 |
| 15 | 550 | 64% | 13.75 | 2.5% | 100 | 999 |
| 16 | 550 | 64% | 5.5 | 1% | 100 | 900-999 |
| 17 | 550 | 63% | 2.75 | 0.5% | 100 | 900-999 |
| 18 | 550 | 65% | 27.5 | 5% | 100 | 900-999 |
| 19 | 550 | 65% | 13.75 | 2.5% | 100 | 900-999 |
| 20 | 550 | 63% | 5.5 | 1% | 100 | 900-999 |
| 21 | 550 | 67% | 2.7 | 0.5% | 100 | 900-999 |

TABLE 5

| Example | wt % of Particle size x [mm] | | | | | Yield [%] |
|---|---|---|---|---|---|---|
| | x < 0.3 | 0.3 < x < 0.6 | 0.6 < x < 1 | 1 < x < 2 | x > 2 | |
| 13 | 1 | 1 | 1 | 2 | 64 | 69 |
| 14 | 1 | 3 | 11 | 22 | 31 | 68 |
| 15 | 1 | 3 | 12 | 29 | 53 | 98 |
| 16 | 6 | 15 | 16 | 15 | 41 | 93 |
| 17 | 11 | 19 | 18 | 19 | 26 | 93 |
| 18 | 2 | 4 | 7 | 22 | 59 | 94 |
| 19 | 11 | 24 | 13 | 10 | 27 | 85 |
| 20 | 13 | 19 | 16 | 17 | 28 | 93 |
| 21 | 6 | 15 | 24 | 24 | 24 | 93 |

The above examples clearly show that granules can be produced from surface-reacted calcium carbonate with standard binding agents.

4. Comparative Experiments

The following examples serve to demonstrate the importance of a) the use of a surface-reacted calcium carbonate according to the present invention as well as b) the saturation of the surface-reacted calcium carbonate as defined in the present invention. These Examples, e.g., reflect compositions such as those described in EP 2 662 416 A1.

Example 22

Preparation

A water based scalenohedral PCC (S-PCC) in the form of a suspension having a solids content of 14 wt % (available from Omya Switzerland) and having a $d_{50}$ of 4.2 μm and a $d_{95}$ of 9 μm measured using the Malvern Mastersizer 20000 Laser Diffraction System (corresponding to a $d_{50}$ of 2.5 μm and a $d_{95}$ of 5 μm measured using a Sedigraph instrument) was provided. Then, a 35 wt % solution of trisodium citrate (prepared from tridosium citrate dihydrate, commercially available from Sigma Aldrich) was added under stirring to the S-PCC suspension to have 0.09 wt % ratio of trisodium citrate to S-PCC based on dry amounts. After ten minutes of further stirring, 0.2 wt % (based on dry amounts on S-PCC) Niklacell T10G (carboxymethylcellulose (CMC) having a molecular weight of 60 000 g/mol; commercially available from Mare Austria GmbH) and 0.28 wt % (based on dry amounts on S-PCC) Niklacell CH90F (carboxymethylcellulose (CMC) having a molecular weight of 200 000 g/mol; commercially available from Mare Austria GmbH) were added as 6 wt % suspensions under continued stirring.

The particle size distribution of the resulting intermediary product (PHCH 0) was measured and SEM pictures were taken.

Subsequently, 2 wt % (based on dry amounts on S-PCC) of cationic starch (C*Bond HR 35845, commercially available from Cargill Deutschland GmbH) was added as cationic polymer in the form of a powder to the above product under stirring. Then, the suspension was heated to 100° C. and stirred for 1 hour. The suspension then was cooled down to room temperature under ambient conditions (no active cooling).

The particle size distribution of the final product (PHCH 1) was measured and SEM pictures were taken.

In order to show that the eventually formed soft aggregates due to the cationic starch addition are not stable, additionally also a sample of the final product was subjected to 1 min of ultra-sonication in the Malvern Mastersizer 2000 before performing the PSD measurement (PHCH 1 US).

Figure 7:
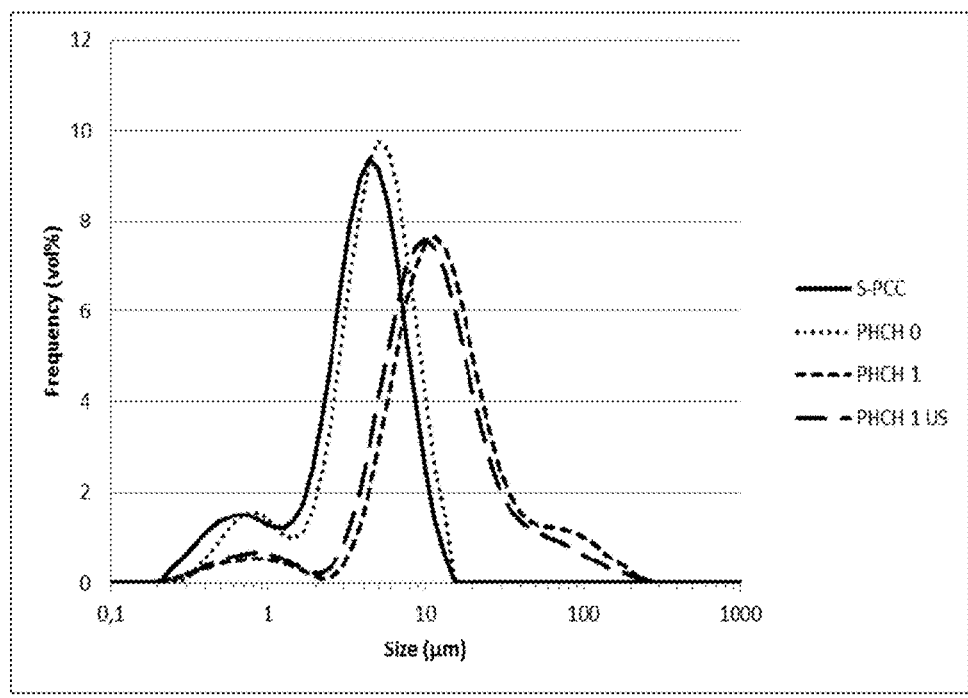
FIG. 7 shows the particle size distributions of scalenohedral PCC and further comparative calcium carbonates combined with trisodium citrate and a cationic binder FIGS. 8a and b show SEM pictures of scalenohedral PCC (FIG. 8a) and further comparative calcium carbonate combined with trisodium citrate (FIG. 8b)

Results:

As can be seen in FIG. 7, there is a very small shift of the PSD from the starting material (S-PCC) to the intermediate product (PHCH 0), however, the change in $d_{50}$ is negligible (table 6).

TABLE 6

|  | $d_{50}$ (µm) |
|---|---|
| S-PCC | 4.2 |
| PHCH0 | 4.3 |
| PHCH 1 | 11.3 |
| PHCH 1 US | 9.7 |

Figure 8A:
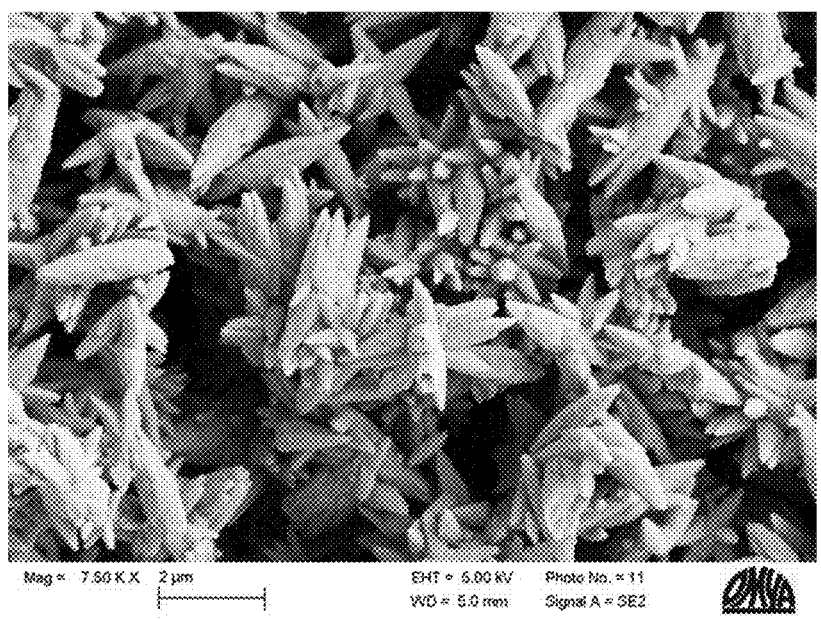
Figure 8B:
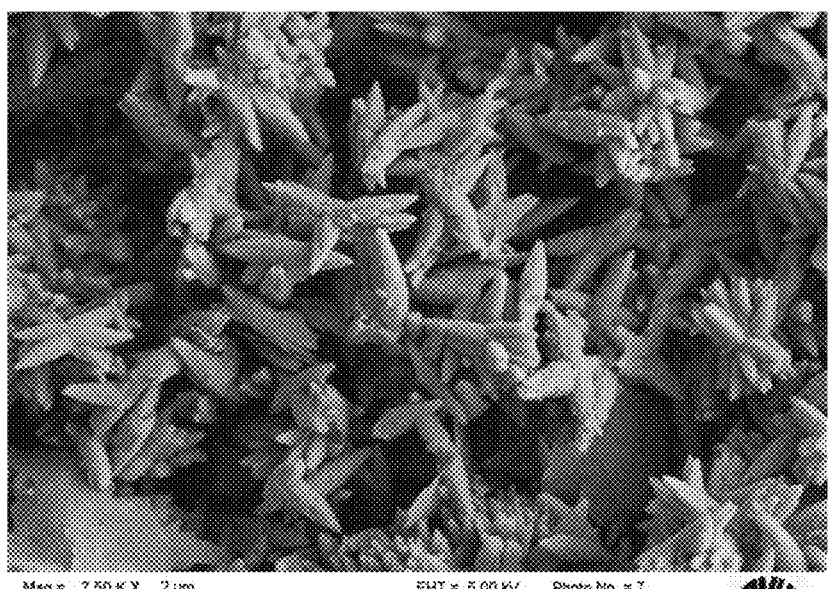

FIG. 8 also shows that the obtained product from PHCH0 (FIG. 8*b*) does not differ visually from the starting material S-PCC (FIG. 8*a*). So the treatment that is applied in the PHCH0 example is not leading to a (surface) modification of the starting material (S-PCC) into a surface reacted calcium carbonate according to the present invention, which, in the case of PCC, would have required an excess of solubilised calcium ions as described in WO 2009/074492 A1 and mentioned above.

Furthermore, it can be seen that the addition of cationic starch leads to a small shift of the PSD to increased particle sizes, also reflected by the $d_{50}$ (table 1). It also can be seen that a small amount of agglomerates (around 1 vol %) is formed around 100 µm (apparent as shoulder around 100 µm).

However, as the ultrasonic treatment in PHCH1 US treatment is able to reduce the amount of agglomerates and generally shift the PSD curve to finer values (FIG. 7, table 6), it is also shown that the formed agglomerates are only weakly held together and cannot be considered as granules according to the present invention.

Furthermore, as the amount of agglomerates is very small, the $d_{50}$ of the PHCH 1 sample is still well below the typical size range that is obtained by granulation according to the present invention.

Figure 9A:
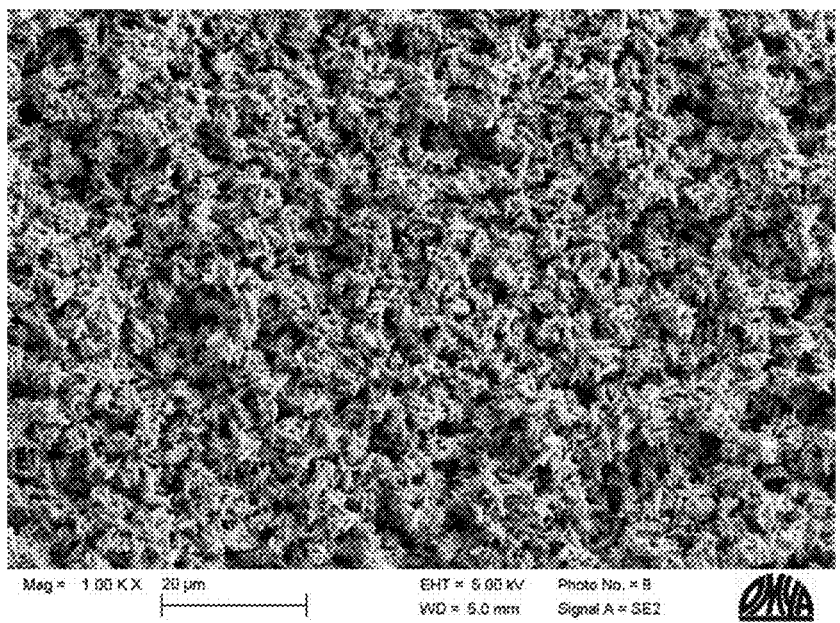
FIG. 9 shows of scalenohedral PCC (FIG. 9a) and further comparative calcium carbonates combined with trisodium citrate and a cationic binder (FIG. 9b)
Figure 9B:
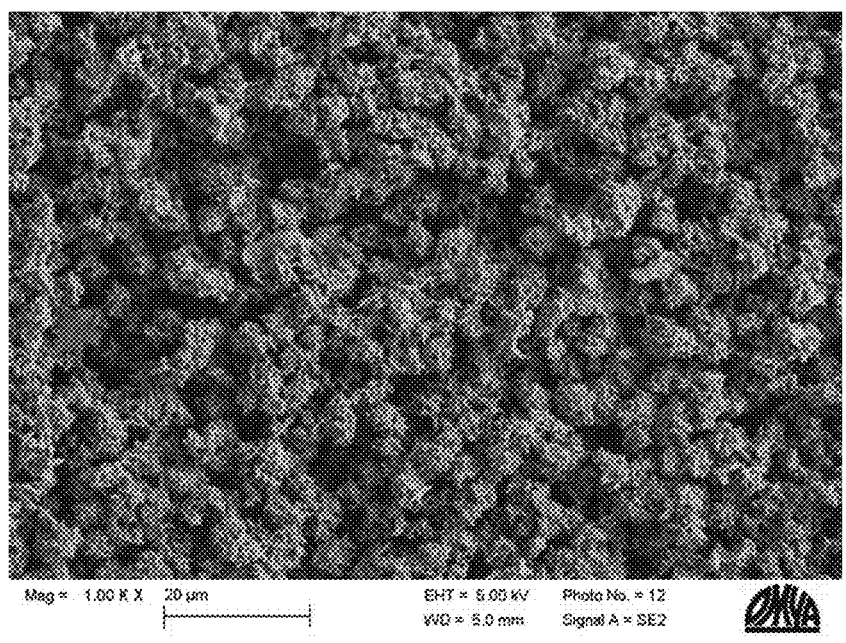

In FIG. 9 it also can be seen visually that the addition of cationic starch to PHCH0 (FIG. 9*b*) did not lead to the formation of granules as the PCC particles still appear as individual particle as in the case of S-PCC ((FIG. 9*a*).

Figure 10:
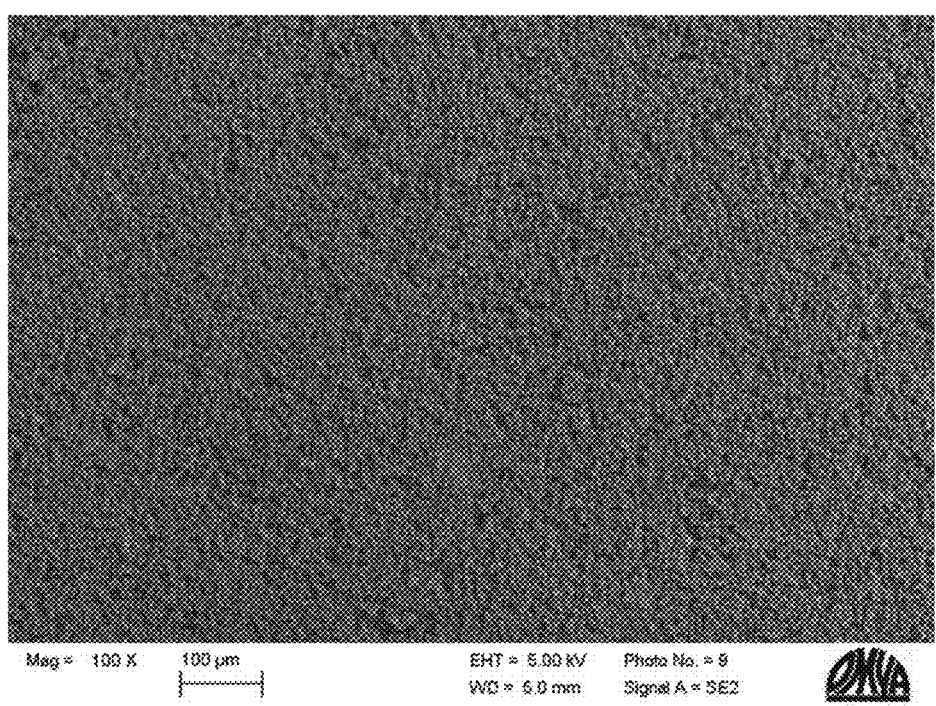
FIG. 10 shows comparative calcium carbonate combined with trisodium citrate and a cationic binder

FIG. 10 also shows visually that no agglomerates can be found in the described size range.

The invention claimed is:

1. A method for producing granules comprising surface-reacted calcium carbonate, the method comprising the steps of:
   a) providing surface-reacted calcium carbonate, wherein the surface-reacted calcium carbonate is a reaction product of natural ground or precipitated calcium carbonate with carbon dioxide and one or more acids, wherein the carbon dioxide is formed in situ by the acid treatment and/or is supplied from an external source;
   b) saturating the surface-reacted calcium carbonate of step a) with one or more liquids in order to obtain a liquid saturated surface-reacted calcium carbonate that is not oversaturated;
   c) providing one or more binders;
   d) combining the liquid saturated surface-reacted calcium carbonate of step b) with the one or more binders of step c) under agitation in an agitation device to form granules comprising surface-reacted calcium carbonate; and
   e) removing the liquid from the granules of step d).

2. The method according to claim 1, wherein the surface-reacted calcium carbonate in step a) is a reaction product of natural ground calcium carbonate with carbon dioxide and one or more acids, wherein the carbon dioxide is formed in situ by the acid treatment and/or is supplied from an external source, and wherein the natural ground calcium carbonate comprises marble, chalk, dolomite, limestone or any mixture thereof.

3. The method according to claim 1, wherein the surface-reacted calcium carbonate in step a) is a reaction product of precipitated calcium carbonate with carbon dioxide and one or more acids, wherein the carbon dioxide is formed in situ by the acid treatment and/or is supplied from an external source, and wherein the precipitated calcium carbonate comprises one or more aragonitic, vateritic and calcitic mineralogical crystal forms.

4. The method according to claim 1, wherein the surface-reacted calcium carbonate has a specific surface area of from 1 $m^2/g$ to 200 $m^2/g$, measured using nitrogen and the BET method according to ISO 9277.

5. The method according to claim 1, wherein the surface-reacted calcium carbonate has a specific surface area of from 20 $m^2/g$ to 80 $m^2/g$, measured using nitrogen and the BET method according to ISO 9277.

6. The method according to claim 1, wherein the surface-reacted calcium carbonate has a volume median grain diameter $d_{50}$ of from 0.5 to 50 µm.

7. The method according to claim 1, wherein the surface-reacted calcium carbonate has a volume median grain diameter $d_{50}$ of from 1 to 10 µm.

8. The method according to claim 1, wherein the surface-reacted calcium carbonate has an intra-particle porosity within the range of from 5 vol. % (v/v) to 50 vol. % (v/v), calculated from a mercury porosimetry measurement.

9. The method according to claim 1, wherein the surface-reacted calcium carbonate has an intra-particle porosity within the range of from 20 vol. % (v/v) to 50 vol. % (v/v), calculated from a mercury porosimetry measurement.

10. The method according to claim 1, wherein the surface-reacted calcium carbonate has an intra-particle intruded specific pore volume within the range of 0.150 to 1.300 cm³/g, calculated from mercury porosimetry measurement.

11. The method according to claim 1, wherein the surface-reacted calcium carbonate has an intra-particle intruded specific pore volume within the range of 0.178 to 1.244 cm³/g, calculated from mercury porosimetry measurement.

12. The method according to claim 1, wherein in step b), the liquid is selected from the group consisting of water, methanol, ethanol, n-butanol, isopropanol, n-propanol, and any mixture thereof.

13. The method according to claim 1, wherein in step b), the liquid is water.

14. The method according to claim 1, wherein the one or more binders of step c) is selected from the group consisting of a synthetic polymer, methylcellulose, ethylcellulose, sodium carboxymethylcellulose, hydroxypropyl methylcellulose (HPMC), hydroxypropylcellulose (HPC), ethylhydroxyethylcellulose (EHEC), polyvinyl pyrrolidone (PVP), polyethylene glycol (PEG), a polyvinyl alcohol, apolymethacrylate, a natural binder, a plant gum, acacia, tragacanth, sandarac, ghatti, karaya, locust bean, guar, a protein, gelatin, casein, collagen, a saccharide, a polysaccharide, starch, a starch derivatives, inulin, cellulose, a pectin, a carrageenan, a sugar, an animal exudate, shellac, alginic acid, and any mixture thereof.

15. The method according to claim 1, wherein the one or more binders of step c) is selected from the group consisting of sodium carboxymethylcellulose, hydroxypropyl methylcellulose (HPMC), polyvinyl pyrrolidone (PVP), pectin, and locus beam gum.

16. The method according to claim 1, wherein the one or more binders of step c) is added in an amount of from 0.5 to 50 wt %, based on the weight of surface-reacted calcium carbonate of step a).

17. The method according to claim 1, wherein the one or more binders of step c) is added in an amount of from 2.5 to 15 wt %, based on the weight of surface-reacted calcium carbonate of step a).

18. The method according to claim 1, wherein the one or more binders of step c) is added in an amount of from 5 to 10 wt %, based on the weight of surface-reacted calcium carbonate of step a).

19. The method according to claim 1, wherein in step d), the agitation device is selected from the group consisting of an Eirich mixer, a fluidized bed dryer/granulator, a plate granulator, a table granulator, a drum granulator, a disc granulator, a dish granulator, a plowshare mixer, a high speed blender, and a rapid mixer granulator.

20. The method according to claim 1, wherein in step d), the one or more binders is added to the agitation device simultaneously with or after the liquid saturated surface-reacted calcium carbonate.

21. The method according to claim 1, wherein after the combination of the liquid saturated surface-reacted calcium carbonate and the one or more binders in step d), further surface-reacted calcium carbonate or liquid saturated surface-reacted calcium carbonate or a mixture thereof, and/or liquid is added until an agglomeration of the particles is observed.

22. The method according to claim 21, wherein the further surface-reacted calcium carbonate or liquid saturated surface-reacted calcium carbonate or mixture thereof is added in an amount of from 1 to 30 wt %, based on the weight of the surface-reacted calcium carbonate provided in step a).

23. The method according to claim 21, wherein the further surface-reacted calcium carbonate or liquid saturated surface-reacted calcium carbonate or mixture thereof is added in an amount of from 5 to 15 wt %, based on the weight of the surface-reacted calcium carbonate provided in step a).

24. The method according to claim 1, wherein in step e), the liquid is removed by separating the liquid from the granules.

25. The method according to claim 1, wherein in step e), the liquid is removed by drying in a rotational oven, jet-drying, fluidized bed drying, freeze drying or flash drying.

26. The method according to claim 1, wherein the granules obtained after step e) have a volume median particle size of from 0.1 to 6 mm, determined by sieve fractioning.

27. The method according to claim 1, wherein the granules obtained after step e) have a volume median particle size of from 0.2 to 2 mm, determined by sieve fractioning.

28. The method according to claim 1, wherein the granules obtained after step e) have a specific surface area of from 1 to 150 m²/g, measured using nitrogen and the BET method according to ISO 9277.

29. The method according to claim 1, wherein the granules obtained after step e) have a specific surface area of from 20 to 70 m²/g, measured using nitrogen and the BET method according to ISO 9277.

30. Granules comprising surface reacted calcium carbonate obtained by the method according to claim 1.

* * * * *